(12) United States Patent
Conley et al.

(10) Patent No.: US 9,243,727 B2
(45) Date of Patent: Jan. 26, 2016

(54) HIGH TEMPERATURE FIBER REINFORCED PIPE

(75) Inventors: Jeffrey Conley, Calgary (CA); Peter Jackson, Toronto (CA); Blaine Weller, Calgary (CA)

(73) Assignee: FLEXPIPE SYSTEMS INC., Calgary (CA)

( * ) Notice: Subject to any disclaimer, the term of this patent is extended or adjusted under 35 U.S.C. 154(b) by 1128 days.

(21) Appl. No.: 12/712,060

(22) Filed: Feb. 24, 2010

(65) Prior Publication Data
US 2010/0218839 A1 Sep. 2, 2010

Related U.S. Application Data

(60) Provisional application No. 61/156,252, filed on Feb. 27, 2009.

(51) Int. Cl.
*F16L 11/00* (2006.01)
*F16L 11/08* (2006.01)
(Continued)

(52) U.S. Cl.
CPC ........... *F16L 11/082* (2013.01); *B29C 44/1285* (2013.01); *B32B 1/08* (2013.01); *B32B 5/022* (2013.01); *B32B 5/12* (2013.01); *B32B 5/18* (2013.01); *B32B 5/22* (2013.01); *B32B 5/245* (2013.01); *B32B 5/26* (2013.01); *B32B 7/02* (2013.01); *B32B 27/065* (2013.01); *B32B 27/08* (2013.01); *B32B 27/12* (2013.01); *B32B 27/18* (2013.01); *B32B 27/20* (2013.01); *B32B 27/285* (2013.01); *B32B 27/286* (2013.01); *B32B 27/288* (2013.01); *B32B 27/304* (2013.01); *B32B 27/32* (2013.01); *B32B 27/34* (2013.01); *B32B 27/36* (2013.01); *B32B 27/40* (2013.01);
(Continued)

(58) Field of Classification Search
USPC .................................. 138/130, 137; 428/36.91
See application file for complete search history.

(56) References Cited

U.S. PATENT DOCUMENTS

| | | | |
|---|---|---|---|
| 2,815,043 | A | 12/1957 | Kleiner et al. |
| 3,117,597 | A | 12/1957 | Fritz et al. |

(Continued)

FOREIGN PATENT DOCUMENTS

| | | |
|---|---|---|
| CA | 2513506 A1 | 8/2004 |
| CN | 2268175 Y | 11/1997 |

(Continued)

OTHER PUBLICATIONS

A. G. Gibson, FRC '98, Consolidating New Applications, Seventh International Conference on Reinforced Composites, Conference Proceedings, Apr. 15-17, 1998, University of Houston Libraries.

*Primary Examiner* — James Hook
(74) *Attorney, Agent, or Firm* — Bennett Jones LLP

(57) ABSTRACT

A high temperature flexible pipe and method of making a high temperature flexible pipe is provided. The pipe can have an inner tubular layer formed of a high temperature thermoplastic, a first reinforcing layer, a second reinforcing layer and an outer sheath. In one aspect, an insulating layer may be provided between the second reinforcing layer and the outer sheath. A method of making a flexible pipe is also provided. The first reinforcing layer is wound around the inner tubular layer and the second reinforcing layer is wound around the first reinforcing layer. An outer sheaf can be formed over the second reinforcing layer. In another aspect, an insulating layer can be formed over the second reinforcing layer before an outer jacket is formed over the insulating layer.

36 Claims, 4 Drawing Sheets

(51) Int. Cl.

| | | |
|---|---|---|
| *B29C 44/12* | (2006.01) | |
| *B32B 27/08* | (2006.01) | |
| *B32B 5/02* | (2006.01) | |
| *B32B 5/12* | (2006.01) | |
| *B32B 5/18* | (2006.01) | |
| *B32B 5/22* | (2006.01) | |
| *B32B 5/24* | (2006.01) | |
| *B32B 5/26* | (2006.01) | |
| *B32B 7/02* | (2006.01) | |
| *B32B 27/06* | (2006.01) | |
| *B32B 27/12* | (2006.01) | |
| *B32B 27/18* | (2006.01) | |
| *B32B 27/20* | (2006.01) | |
| *B32B 27/28* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |
| *B32B 27/40* | (2006.01) | |
| *B32B 1/08* | (2006.01) | |
| *B29C 47/00* | (2006.01) | |
| *B29C 47/02* | (2006.01) | |
| *B29K 105/04* | (2006.01) | |
| *B29L 23/00* | (2006.01) | |
| *B29C 47/06* | (2006.01) | |

(52) U.S. Cl.
CPC ............ *B29C 47/00* (2013.01); *B29C 47/0023* (2013.01); *B29C 47/02* (2013.01); *B29C 47/021* (2013.01); *B29C 47/065* (2013.01); *B29K 2105/04* (2013.01); *B29L 2023/00* (2013.01); *B32B 2262/0261* (2013.01); *B32B 2262/0269* (2013.01); *B32B 2262/0276* (2013.01); *B32B 2262/101* (2013.01); *B32B 2262/103* (2013.01); *B32B 2262/106* (2013.01); *B32B 2266/02* (2013.01); *B32B 2307/30* (2013.01); *B32B 2307/50* (2013.01); *B32B 2307/54* (2013.01); *B32B 2307/546* (2013.01); *B32B 2307/554* (2013.01); *B32B 2307/704* (2013.01); *B32B 2307/712* (2013.01); *B32B 2307/714* (2013.01); *B32B 2307/7242* (2013.01); *B32B 2307/7265* (2013.01); *B32B 2597/00* (2013.01)

(56) References Cited

U.S. PATENT DOCUMENTS

| | | | |
|---|---|---|---|
| 3,458,604 A * | 7/1969 | Rex | 428/379 |
| 3,481,369 A | 12/1969 | Ganahi | |
| 3,604,461 A | 9/1971 | Matthews et al. | |
| 3,905,398 A | 9/1975 | Johansen et al. | |
| 3,948,292 A | 4/1976 | Goto et al. | |
| 4,023,835 A | 5/1977 | Ewing et al. | |
| 4,173,670 A | 11/1979 | VanAuken | |
| 4,248,062 A | 2/1981 | McLain et al. | |
| 4,273,160 A | 6/1981 | Lowles | |
| 4,343,333 A | 8/1982 | Keister | |
| 4,384,595 A | 5/1983 | Washkewicz et al. | |
| 4,431,034 A | 2/1984 | Abdullaev et al. | |
| 4,515,737 A | 5/1985 | Karino et al. | |
| RE32,230 E | 8/1986 | Satoh et al. | |
| 4,850,395 A | 7/1989 | Briggs | |
| 4,860,798 A | 8/1989 | Kovacs et al. | |
| 4,898,212 A | 2/1990 | Searfoss et al. | |
| 5,024,252 A | 6/1991 | Ochsner | |
| 5,052,444 A | 10/1991 | Messerly et al. | |
| 5,261,462 A | 11/1993 | Wolfe et al. | |
| 5,316,046 A | 5/1994 | Igarashi et al. | |
| 5,407,436 A | 4/1995 | Toft et al. | |
| 5,445,191 A | 8/1995 | Green et al. | |
| 5,629,062 A * | 5/1997 | Ejiri et al. | 428/36.9 |
| 5,783,620 A * | 7/1998 | Hamashima et al. | 524/405 |
| 6,039,084 A | 3/2000 | Martucci et al. | |
| 6,112,771 A | 9/2000 | Aoyagi et al. | |
| 6,684,910 B2 * | 2/2004 | Stoffelsma et al. | 138/137 |
| 6,807,988 B2 | 10/2004 | Powell et al. | |
| 6,809,154 B2 * | 10/2004 | Lindahl et al. | 525/191 |
| 6,889,716 B2 | 5/2005 | Lundberg et al. | |
| 7,308,912 B2 * | 12/2007 | Watanabe et al. | 138/137 |
| 8,394,471 B2 * | 3/2013 | Fisher | 428/35.7 |
| 2002/0054968 A1 | 5/2002 | Hauber | |
| 2003/0127147 A1 | 7/2003 | Van Dam et al. | |
| 2003/0149162 A1 * | 8/2003 | Ahlstrand | 524/495 |
| 2004/0170790 A1 * | 9/2004 | Ek et al. | 428/36.91 |
| 2005/0217747 A1 * | 10/2005 | Buriak et al. | 138/140 |
| 2006/0093769 A1 * | 5/2006 | Biebuyck | 428/36.91 |
| 2007/0200342 A1 | 8/2007 | Roberts-Moore et al. | 285/288.1 |
| 2008/0036198 A1 | 2/2008 | Roberts-Moore et al. | 285/21.2 |
| 2008/0257482 A1 * | 10/2008 | Jeruzal et al. | 156/188 |
| 2010/0071796 A1 * | 3/2010 | Ek et al. | 138/140 |

FOREIGN PATENT DOCUMENTS

| | | |
|---|---|---|
| EP | 0385731 A1 | 9/1990 |
| EP | 0750973 A2 | 1/1997 |
| EP | 0969236 A2 | 1/2000 |
| GB | 1263060 A | 2/1972 |
| WO | WO 03/086756 A1 | 10/2003 |

* cited by examiner

US 9,243,727 B2

HIGH TEMPERATURE FIBER REINFORCED PIPE

CROSS REFERENCE TO RELATED APPLICATIONS

The present application claims priority under 35 U.S.C. §119(e) to U.S. provisional patent application No. 61/156,252 filed Feb. 27, 2009.

FIELD OF THE INVENTION

The present invention relates to fiber reinforced pipes and more particularly to fiber reinforced pipe for use at elevated temperatures.

BACKGROUND OF THE INVENTION

Flexible pipes are needed for conveying fluids under pressure such as natural gas, sour gas, carbon dioxide, hydrocarbons, etc. In some applications these fluids are at elevated temperatures which can decrease the life and performance of flexible pipes made of conventional materials.

It is desirable that the pipe be capable of being spoolable, handled, bent, etc. without collapsing, buckling, splitting, cracking, etc., even in low temperature environments, yet also be capable of containing high pressure flows at elevated temperatures under conditions of use, such as when buried, unrestrained and bent.

SUMMARY OF THE INVENTION

A flexible, fiber reinforced pipe for transporting pressurized fluid having an elevated temperature is provided. The pipe is flexible enough to be spooled for transport, handling or storage, even under colder winter conditions, but has sufficient performance properties to withstand typical loading when carrying pressurized fluid at elevated temperatures.

In one aspect, the pipe has an inner tubular layer made from a high temperature thermoplastic, a first reinforcing layer, a second reinforcing layer, and an outer sheath. The inner tubular layer can act to contain the fluid passing through the pipe, preventing it from leaking or diffusing through pipe, with the first reinforcing layer and second reinforcing layer acting to react to radial and axial loading imposed on the pipe.

In a further aspect, a pipe can be provided having an inner tubular layer made from a high temperature thermoplastic, a first reinforcing layer, a second reinforcing layer, an insulating layer provided surrounding the inner tubular layer, the first reinforcing layer and the second reinforcing layer to insulate the pipe and the fluid passing through the pipe.

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the figures, wherein.

DESCRIPTION OF VARIOUS EMBODIMENTS

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

Figure 1:
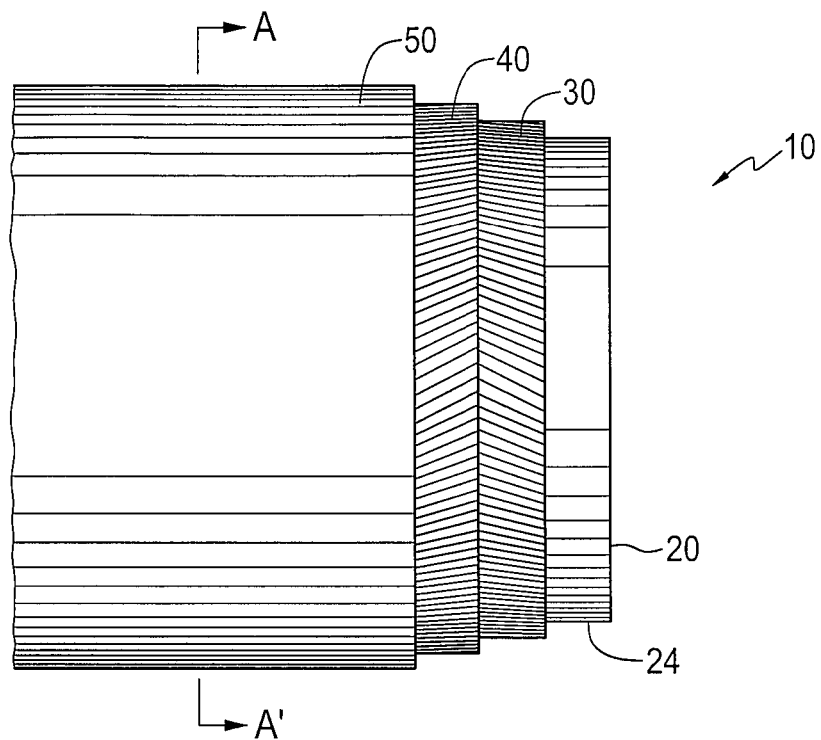
FIG. 1 is a side view of a pipe in a first aspect, partially cut away, in successive layers.
Figure 2:
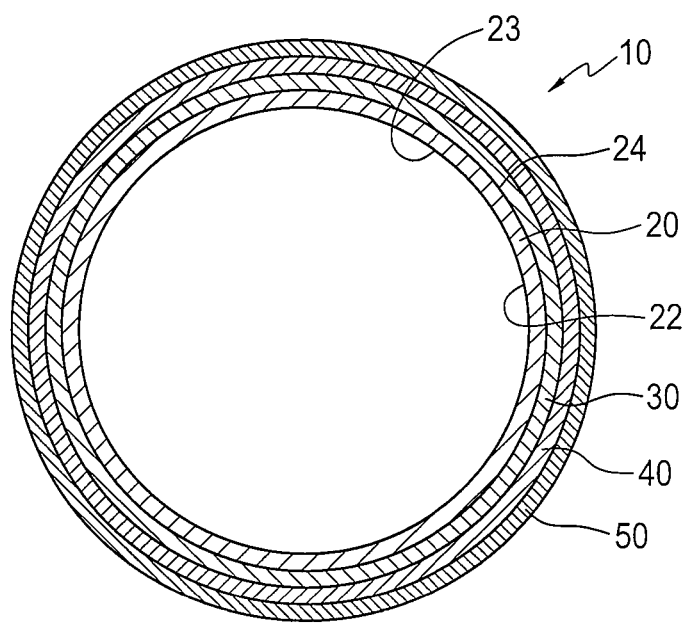
FIG. 2 is an end sectional view of the pipe of FIG. 1 along line AA'.

FIGS. 1 and 2 illustrate a flexible, fiber reinforced pipe 10 capable of transporting pressurized fluids, such as oil, gas, water, oil emulsion, etc., that may be at elevated temperatures. The pipe 10 has an inner tubular layer 20, a first reinforcing layer 30, a second reinforcing layer 40, and an outer sheath 50. The inner tubular layer 20 can have an inner surface 22, defining an inner diameter 23 and an outer surface 24. The first reinforcing layer 30 may lie adjacent to the inner tubular layer 20, typically in contact with the outer surface 24 of the inner tubular layer 20 and the second reinforcing layer 40 may lie adjacent to the first reinforcing layer 30. The outer sheath 50 surrounds the second reinforcing layer 40, the first reinforcing layer 30 and the inner tubular layer 20 and can be in contact with the second reinforcing layer 40. In an aspect, the outer sheath 50 can be directly exposed to the environment surrounding the pipe 10.

The inner tubular layer 20 defines an inner diameter 23 through which fluids to be conveyed flow and can be used as a leak bladder and liner to contain the fluid passing through the pipe 10. The inner tubular layer 20 can be formed of a high temperature thermoplastic. A high temperature thermoplastic can retain significant mechanical properties as the service temperature is increased from 60° C. to at least 82° C. Critical properties may be a tensile strength at yield of approximately 1350 psi or greater at 82° C., as well as appropriate compressive creep resistance at 82° C. wherein tensile strength is measured using ASTM D638 at a cross head speed of 2 inches/minute. In another aspect, the critical properties may be a tensile strength at yield of approximately 1650 psi at 82° C. and 1200 psi at 93° C. Possible high temperature thermoplastics include polypropylene (such as one of a impact copolymer, a random copolymer, homopolymer, nucleated homopolymer, high crystalline polymer, high crystalline copolymer, etc.), HDPE-RT (high density polyethylene with additives to increase the higher temperature performance, it could also be bimodal HDPE-RT), PEX (cross linked polyethelene) with silane cross linking, peroxide cross linking or radiation cross linking, PPX (cross linked polypropylene), polybutene, polypropylene based thermoplastic vulcanizates, thermoplastic polyester, thermoplastic polyeurethane, or thermoplastic nylon. In an aspect, additives such as thermal stabilizers, antioxidants, fillers, process aids, compatibilisers, etc. could be added to the high temperature thermoplastics.

If a high crystalline polymer is used, achieving high crystallinity depends on the polymer selection and the manufacturing process parameters. In one aspect, the crystallinity will contain 45% or higher crystalline content.

In many applications, the inner tubular layer 20 can be made substantially impermeable to the fluid passing through the pipe 10 to prevent the fluid from leaking through the inner tubular layer 20 and into the first reinforcing layer 30 and the second reinforcing layer 40. The high temperature thermoplastic making up the inner tubular layer 20 can also be selected to be substantially resistant to degradation by the fluid passing through the pipe 10. In some cases, the inner tubular layer 20 may allow some gas diffusion through it but is still substantially impermeable to liquid. In other cases, the high temperature thermoplastic forming the inner tubular layer 20 may be selected so that it substantially prevents gaseous diffusion outwardly from the inner diameter 23, in addition to being liquid impermeable.

The first reinforcing layer 30 and the second reinforcing layer 40 can contain fibers that are helically wound around the inner tubular layer 20. The first reinforcing layer 30 can be made up of one or more fibers that are helically wound around the inner tubular layer 20, with all of these fibers of the first reinforcing layer 30 being wound around the inner tubular layer 20 at substantially the same angle and in a first direction, either in a clockwise or counterclockwise direction relative to the inner tubular layer 20. The second reinforcing layer 40 can also be made up of one or more fibers helically wound at substantially the same angle around the first reinforcing layer 30 in a second direction. The second direction, in which the fibers of the second reinforcing layer 40 are wound can be opposite to the first direction of the first reinforcing layer 30. Therefore, if the fibers of the first reinforcing layer 30 are wound in a clockwise direction relative to the inner tubular layer 20, the fibers of the second reinforcing layer 40 are wound counterclockwise relative to the inner tubular layer 20, and vice versa. The fibers of the first reinforcing layer 30 can therefore be described as being wound around the inner tubular layer 20 in either a positive helical direction or a negative helical direction, while the fibers of the second reinforcing layer 40 can be described as being wound around the first reinforcing layer 30 in either a negative helical direction or a positive helical direction. In this manner, if the fibers of the first reinforcing layer 30 are defined as being wound in a positive helical direction, the fibers of the second reinforcing layer 40 can be defined as being in a negative helical direction and vice versa.

The first reinforcing layer 30 and second reinforcing layer 40 can be formed of substantially continuous fibers. As will be appreciated, substantially continuous fibers are those of long length, rather than being formed of chopped or discrete fibers that are matted, woven or otherwise treated to hold them together.

The fibers in the first reinforcing layer 30 and the second reinforcing layer 40 react to axial and radial loads on the pipe 10. Primary load is in the fiber tensile direction of the fibers in the first reinforcing layer 30 and the second reinforcing layer 40 because typically little side load is induced under normal operating conditions of the pipe 10. The angle of the windings of the fibers in the first reinforcing layer 30 and the second reinforcing layer 40 are selected to compromise between the various loads and conditions to which the product will be exposed during processing and during the use of the pipe 10, with respect to durability and pressure containment, while providing desired flexibility. Winding angles of between 8° and 86° can be used. Generally, a greater angle of winding relative to the length of the pipe 10 will provide more resistance to radial loading, such as from internal pressure caused by the pressurized fluid, while a smaller angle of winding will allow for more resistance to axial loading of the pipe 10. The present pipe 10, being used to contain pressurized fluid with the prominent condition being internal pressure containment, can have the fiber winding angles chosen to favor the radial tensile direction. Other factors such as installation pull force (axial loading) and loads from spooling and unspooling for transport and installation in the field can also be taken into account. In one aspect, winding angles of between 40° and 70° are used, with preferred winding angles being between 50° and 60°.

The fibers in the first reinforcing layer 30 and the second reinforcing layer 40 can be formed of a number of different materials, such as glass (such as E-glass, E-CR glass, or S-glass), carbon, nylon, polyester, aramid, metal, or other suitable material with sufficient tensile strength. The material forming the fibers can also be chosen based on its resistance to chemicals, such as hydrocarbon and water, that may come into contact with the pipe 10 during its use. Additionally, the first reinforcing layer 30 and/or the second reinforcing layer 40 can be made up of a number of different types of fibers formed of different materials so that the first reinforcing layer 30 and/or the second reinforcing layer 40 could receive the benefits of the properties of more than one type of material. Additionally, the fibers could be used as single strands or could be combined, as by twisting or braiding with other fibers to form yarns made up of bundles of fibers which are then wound around the inner tubing layer 20 to form the first reinforcing layer 30 or wound around the first reinforcing layer 30 to form the second reinforcing layer 40.

The outer sheath 50 encloses the inner tubular layer 20, the first reinforcing layer 30 and the second reinforcing layer 40 and, if there are not any intervening layers, lies adjacent to the second reinforcing layer 40. The inner tubular layer 20 can act as a liner preventing fluid from leaking or diffusing through the pipe 10 and the first reinforcing layer 30 and the second reinforcing layer 40 can act to contain the radial force imposed on the pipe 10 by the pressurized fluid passing through the pipe 10. Therefore, the material of the outer sheath 50 can be selected to primarily protect the first reinforcing layer 30 and the second reinforcing layer 40 from damage, such as by abrasion, and assist in stabilizing and holding the fibers of the first reinforcing layer 30 and the second reinforcing layer 40 in place. The outer sheath 50 can be formed of any suitable flexible material that can protect the first reinforcing layer 30 and second reinforcing layer 40. In one aspect, the outer sheath 50 is made of the same high temperature thermoplastic as the inner tubular layer 20 so that it can withstand the same high temperatures as the inner tubular layer 20. In another aspect, the outer sheath 50 can be formed of a different type of thermoplastic than the material used for the inner tubular layer 20, such as a lower temperature thermoplastic, because the outer sheath 50 is separated from the heat of the pressurized fluid being transported by the pipe 10 by the inner tubular layer 20, the first reinforcing layer 30 and the second reinforcing layer 40. Therefore, in some applications the outer sheath 50 may not be subjected to the same elevated temperatures as the inner tubular layer 20, allowing the material selection of the outer sheath 50 to be based on other factors such as abrasion resistance, cost, degradation from environmental effects (i.e. ultraviolet light, weather, etc.), the chemicals that may come in contact with the outer sheath 50, etc. rather than heat resistance, like the inner tubular layer 20.

The pipe 10 can be used to transport pressurized fluids at elevated temperatures. Where previous conventional flexible reinforced pipes may be ideally suited for transporting of pressurized fluids having an upper level temperature of around 60° C., in one aspect, the pipe 10 can transport pressurized fluids with temperatures of 60° C.-120° C.

In the pipe 10, the inner tubular layer 20 does not necessarily need to provide significant structural support for the pipe 10 and may not necessarily be required to withstand the internal pressure imposed by pressurized fluid passing through the pipe 10. Rather, the inner tubular layer 20 can be used to primarily prevent the diffusion of the fluid outwardly from the inner diameter 23. The first reinforcing layer 30 and second reinforcing layer 40 can act in combination to counteract the internal pressure imposed on the pipe 10 by pressurized fluid passing through the pipe 10.

Additionally, the elevated temperature of the pressurized fluid passing through the pipes can cause creep in the layers subjected to the higher temperature where the pipe is connected to a fitting. The fittings typically connect to an end of a section of pipe by using pressure to clamp down on the pipe and hold it in place and connected to the fitting. This pressure, in conjunction with the higher operating temperatures, can cause some of material in the layers of the pipe positioned in the fitting to migrate into any empty spaces in the fitting (i.e. cracks, grooves, between components of the fitting, other empty spaces, etc.), which can decrease the thickness of the pipe in the fitting and cause the clamping force holding the pipe in the fitting to lessen.

The first reinforcing layer 30 and the second reinforcing layer 40 act to contain the majority, if not all, of the radial and axial loads imposed on the pipe 10 by the internal pressure of the pressurized fluid passing through the pipe 10 and tensile loading of the pipe 10. In regards to radial loads imposed by the pressurized fluid passing through the pipe 10, the pressurized fluid presses the inner tubular layer 20 against the first reinforcing layer 30 and the second reinforcing layer 40 of the pipe 10, transferring the forces imposed by the pressure of the fluid on the inner tubular layer 20 to the first reinforcing layer 30 and the second reinforcing layer 40.

While the inner tubular layer 20 does not need to be strong enough to withstand the pressure imposed by the pressurized fluid, the inner tubular layer 20 can be made sufficiently strong to withstand the loads placed on it by the winding process where fibers are wound around the inner tubular layer 20 to form the first reinforcement layer 30 and the second reinforcement layer 40, as well as loads placed on it by the application of the outer sheath 50.

The spacing between the fibers in the first reinforcing layer 30 and the second reinforcing layer 40 are typically chosen to be small enough to prevent the inner tubular layer 20 from being forced between the fibers when high pressure fluid is transported through the pipe 10 so that the inner tubular layer 20 does not need to withstand much of the force imposed on it by the pressurized fluid. Rather, by having sufficiently small spacings between the fibers, the majority of the force imposed on the pipe 10 by the pressurized fluid can be transferred and contained by the first reinforcing layer 30 and the second reinforcing layer 40. The stiffness of the material used for the inner tubular layer 20 is a factor in the size of the spacings of the fibers in the first reinforcing layer 30 and the second reinforcing layer 40 because a stiffer inner tubular layer 20 can better distribute forces imposed on by internal pressure across spaces between the fibers. In some cases, the fibers in the first reinforcing layer 30 and the second reinforcing layer 40 might be positioned so close to each other, even overlapping, so that no substantial spacing occurs between the fibers.

In an aspect, the first reinforcing layer 30 and the second reinforcing layer 40 are substantially free floating between the inner tubular layer 20 and the outer sheath 50 with no bonding, such as by separate adhesives, curable, cured or uncured polymers. In this manner, the separate fibers in the first reinforcing layer 30 and the second reinforcing layer 40 as well as the first reinforcing layer 30 and the second reinforcing layer 40 remain independent and can react to loads in conjunction with each other rather than as a single rigid body.

In another aspect, the fibers of the first reinforcing layer 30 can be wound over the inner tubular layer 20 when the inner tubular layer 20 is in the soft or semi-uncured state, causing the material of the inner tubular layer 20 to partially mold around and adhere to some degree to the fibers of the first reinforcing layer 30. In another aspect, the outer sheath 50 can be applied by extrusion over the second reinforcing layer 40 in such a manner to cause the outer sheath 50 to at least partially mold over the fibers in the second reinforcing layer 40 causing the fibers in the second reinforcing layer 40 to adhere to some degree to the inside of the outer sheath 50 and/or mechanically constrain the second reinforcing layer 40.

Figure 3:
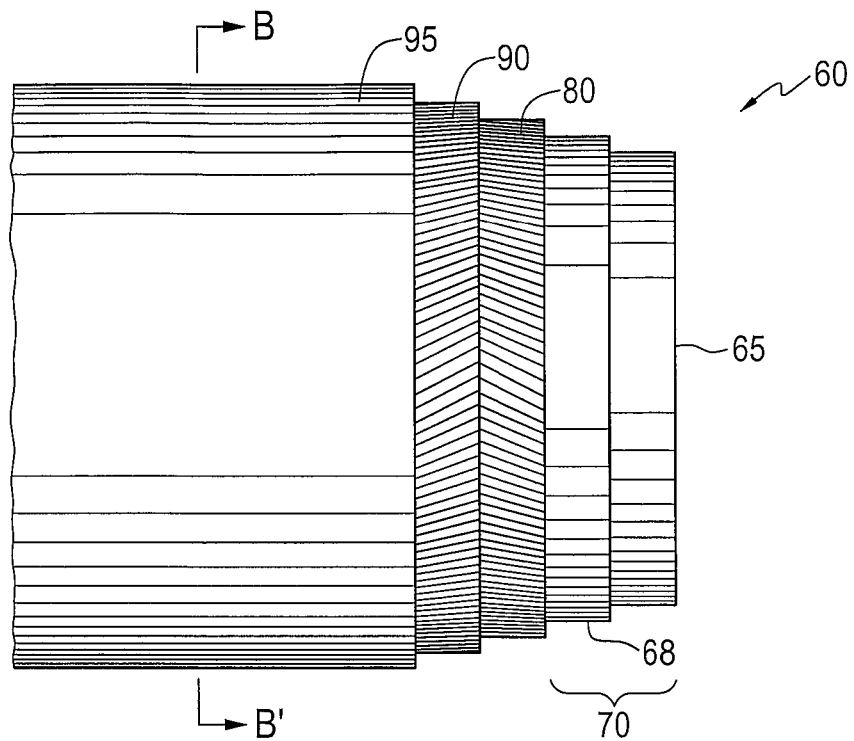
FIG. 3 is a side view of a pipe in a further aspect.
Figure 4:
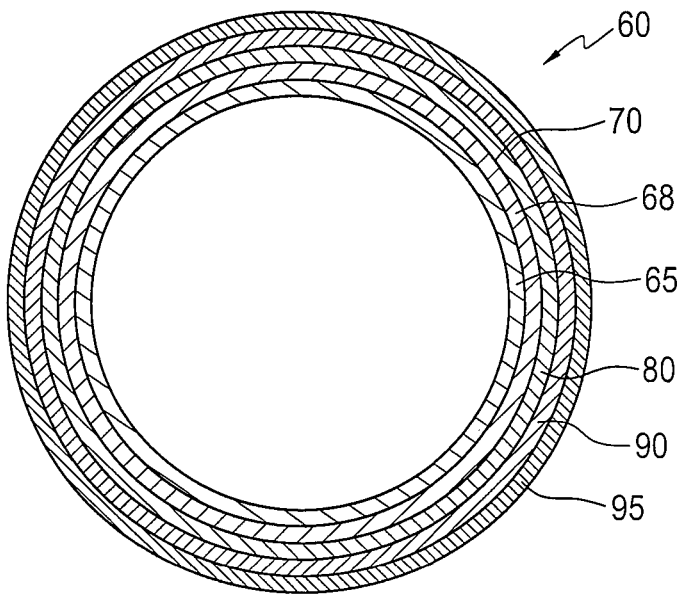
FIG. 4 is an end sectional view of the pipe of FIG. 3 along line BB'.

FIGS. 3 and 4 illustrates a pipe 60 in another aspect. Pipe 60 has an outer sheath 95, a second reinforcing layer 90 and a first reinforcing layer 80, that can be similar to the outer sheath 50, second reinforcing layer 40, and the first reinforcing layer 30, respectively, of the pipe 10 shown in FIG. 1. However, the pipe 60 also has a first inner layer 70 having a first layer 65 and a second layer 68. In one aspect, the first layer 65 could be relatively thin compared to the second layer 68. This first layer 65 could allow the pipe 60 to be used in applications where there could be an incompatibility between the material being transported and the other liner materials that are already mentioned. The first layer 65 could act as a barrier to chemical absorption. In a further aspect, this first reinforcing layer 65 could reduce the rates of gas permeation through the inner layer 70. Material options for this first layer 65 can, in addition to the materials outlined above, could be more expensive materials, including polyphenylene sulfide, polyetheretherketone, polyvinylidene fluoride, polyamide, etc., The second layer 68 can be formed of a high temperature thermoplastic, similar to the inner layer 20 of pipe 10 shown in FIGS. 1 and 2. The first layer 65 can also be a high temperature thermoplastic material chosen for its chemical resistance to the liquids that will be passing through the pipe 60, such as resistance to softening, blistering, absorption, permeation, etc. In this manner, the first layer 65 can be chosen from a high temperature thermoplastic for primarily its chemical resistance to the fluid that will be transported by the pipe 60, while the second layer 68 can be chosen more for its physical properties, cost, etc. rather than its chemical resistance. In one aspect, the first layer 65 can be relatively thin compared to the second layer 68. In one aspect, an adhesive can be used to tie the first layer 65 to the second layer 68.

Figure 5:
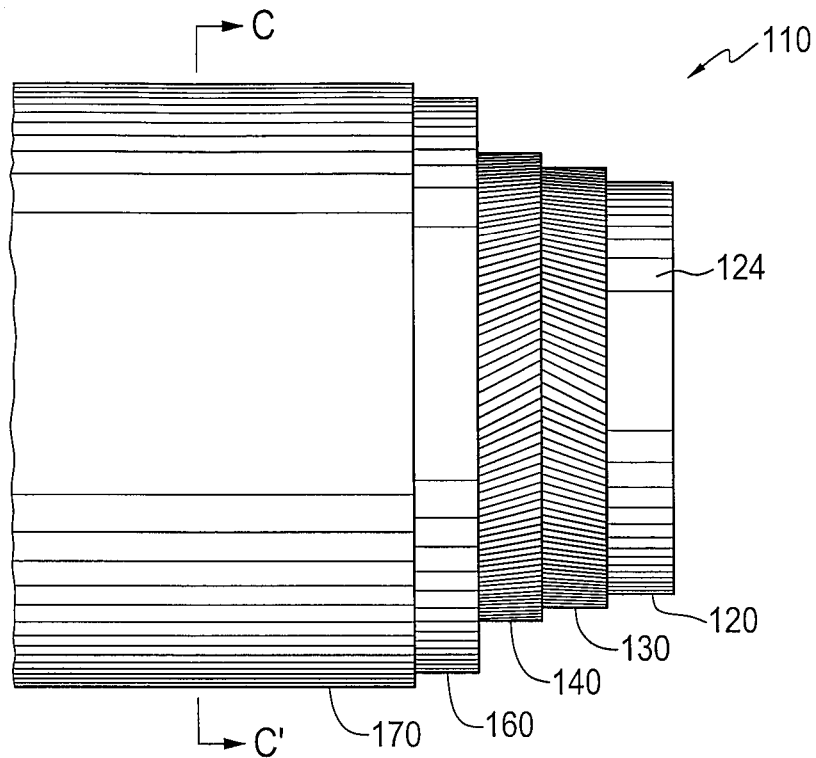
FIG. 5 is side view of a pipe in a further aspect having an insulating layer, partially cut away, in successive layers.
Figure 6:
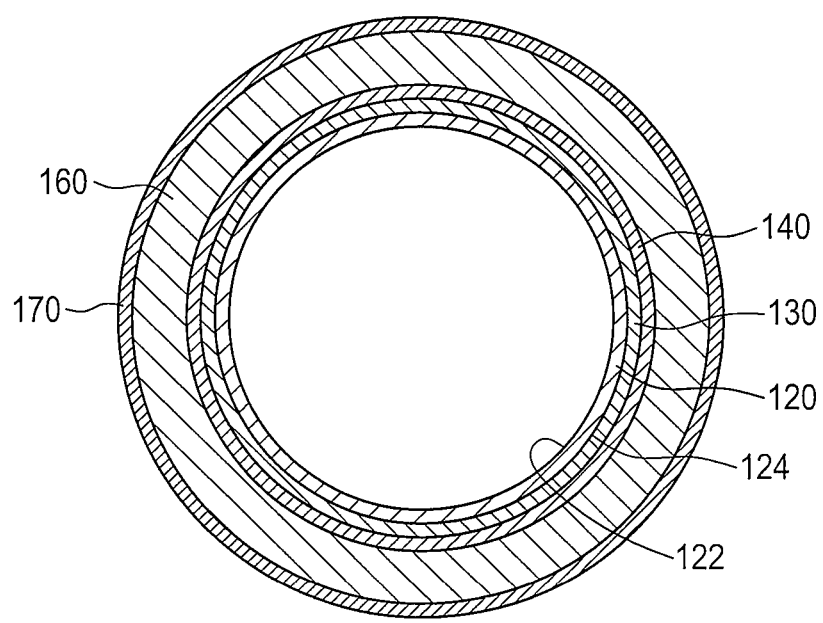
FIG. 6 is an end sectional view of the pipe of FIG. 5 along line CC'.

FIGS. 5 and 6 illustrate a pipe 110 in a further aspect for transporting pressurized fluids such as oil, gas, water, oil emulsion, etc. at elevated temperatures. Pipe 110 has an inner tubular layer 120, with an inner surface 122 and an outer surface 124, a first reinforcing layer 130, a second reinforcing layer 140, an insulating layer 160 and an outer jacket 170.

The inner tubular layer 120, the first reinforcing layer 130, and the second reinforcing layer 140 all can operate in a manner similar to the inner tubular layer 20, the first reinforcing layer 30, and the second reinforcing layer 40 as described for the pipe 10 shown in FIGS. 1 and 2. The inner tubular layer 120 is made of a high temperature thermoplastic and can act to contain fluid in the pipe 110, preventing it from leaking or diffusing through of the inner tubular layer 120. The first reinforcing layer 130 and the second reinforcing layer 140 react to radial and axial forces imposed on the pipe 110.

The insulating layer 160 insulates the pipe 110 including addressing heat loss from the fluid passing through the pipe 110 and can be used to reduce the loss of heat from the pressurized fluid as it is transported through the pipe 110. The insulating layer 160 could be formed of a high temperature thermoplastic material, like the inner tubular layer 120, or other material such as: polyolefins, including polyethylene, polypropylene, syntactic polypropylene, modified polystyrene, polybutylene homopolymers, copolymers, etc.; polystyrene homopolymers and copolymers, including rubber modified polystyrenes etc.; and thermoplastic elastomers and vulcanizates, including those based on polypropylene, ethylene-propylene copolymers and styrene copolymers, etc. This high temperature thermoplastic material can also be mixed with a foaming agent, such as a chemical foaming agent, gas, volatile liquid, etc. to cause the material to foam up, creating air spaces (i.e. gas bubbles) in the material and increasing its insulating abilities, giving it the desired properties of low thermal conductivity and high thermal stability at elevated temperatures. Foams created in this manner are commonly referred to as blown foams. In another embodiment, alternatively or in addition to having gas bubbles in the insulating layer 160, inclusions such as hollow polymer micro-spheres, glass micro-spheres, ceramic (i.e. silica, alumina, etc.) micro-spheres, etc. could be provided in the insulating layer 160. In one aspect, the micro-spheres could be lime-borosilicate glass micro-spheres. Foams created in this manner are commonly referred to as syntactic foams. Syntactic foams can provide superior compressive creep and crush resistance than blown foams, but can also be less efficient thermal insulators and can be more expensive. A cost and performance optimized design may be used to determine whether to use syntactic foam or blown foam in the insulating layer 160. In a further aspect, the insulating layer 160 may be made up of a number of layers of insulating foam with them all being the same type of foam, one or more layers being of syntactic foam with one or more layers being of blown foam, one or more layers of syntactic foam surrounded by one or more layers of blow foam, etc.

If a chemical foaming agent is used, the chemical foaming agent may be via an endothermic (heat absorbing) or an exothermic (heat generating) reaction mechanism whereby a gas, (i.e. CO2, N2, etc.) is generated on decomposition of the foaming agent at an elevated temperature. The chemical foaming agent can be one or more of sodium bicarbonate, citric acid, tartaric acid, azodicarbonamide, 4,4-oxybis (benzene sulphonyl) hydrazide, 5-phenyl tetrazole, dinitrosopentamethylene tetramine, p-toluene sulphonyl semicarbazide, blends thereof, etc. In one aspect, the chemical foaming agent may be an endothermic foaming agent, such as sodium bicarbonate blended with citric or tartaric acid. The initial decomposition temperature along with gas volume, release rate and solubility are important parameters when choosing a chemical foaming agent and need to be carefully matched to the type and melt processing temperature of the particular thermoplastic being foamed.

If physical foaming (i.e. injection of a gas or volatile liquid) is used, the gas or volatile liquid used can be CO2, supercritical CO2, N2, air, helium, argon, aliphatic hydrocarbons, such as butanes, pentanes, hexanes and heptanes, chlorinated hydrocarbons, such as dichloromethane and trichloroethylene, and hydrochlorofluorocarbons, such as dichlorotrifluoroethane, etc. In the case of volatile liquids, foaming occurs when the heated liquid vaporizes into gas. In one aspect, the preferred physical foaming agent could be supercritical CO2.

In an aspect, additives could also be added to the material, such as thermal stabilizers, antioxidants, fillers, process aids, compatibilisers, etc.

Alternatively, no foaming agent could be added to the material of the insulating layer 160 and the insulating layer 160 could simply be applied with a sufficient thickness to act as an insulator for the inner layers and/or does not have a high thermal transfer rate.

The outer jacket 170 can be used to protect the insulating layer 160. It could be formed of the same material as the inner tubular layer 120 and/or the insulating layer 160. However, because of the use of the insulating layer 160, the outer jacket 170 may not be subjected to the same elevated temperatures as the inner tubular layer 120. As a result of its positioning, with the insulating layer 160 between the outer jacket 170 and the inner layers of the pipe 110 that contain the fluid passing through the pipe 110, a lower temperature material can be used for the outer jacket 170, if the surroundings the pipe 110 will be used in do not also have elevated temperatures. This allows the material of the outer jacket 170 to be selected for its ability to act as protection for the insulating layer 160, rather than withstand elevated temperatures.

Figure 7:
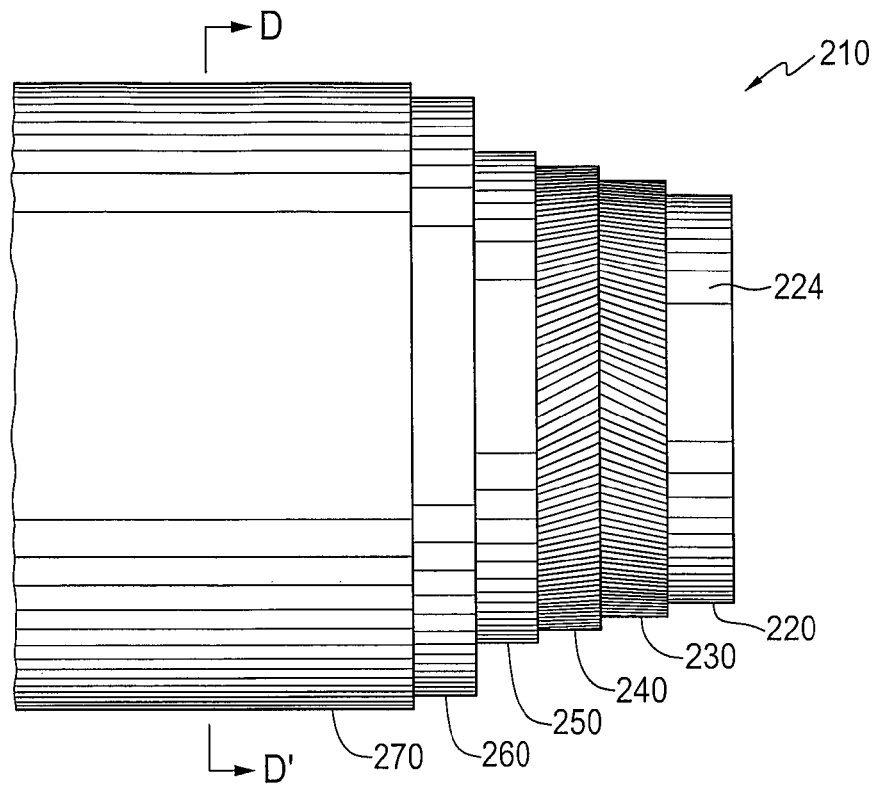
FIG. 7 is a side view of a pipe in a further aspect having an insulating layer, partially cut away, in successive layers.
Figure 8:
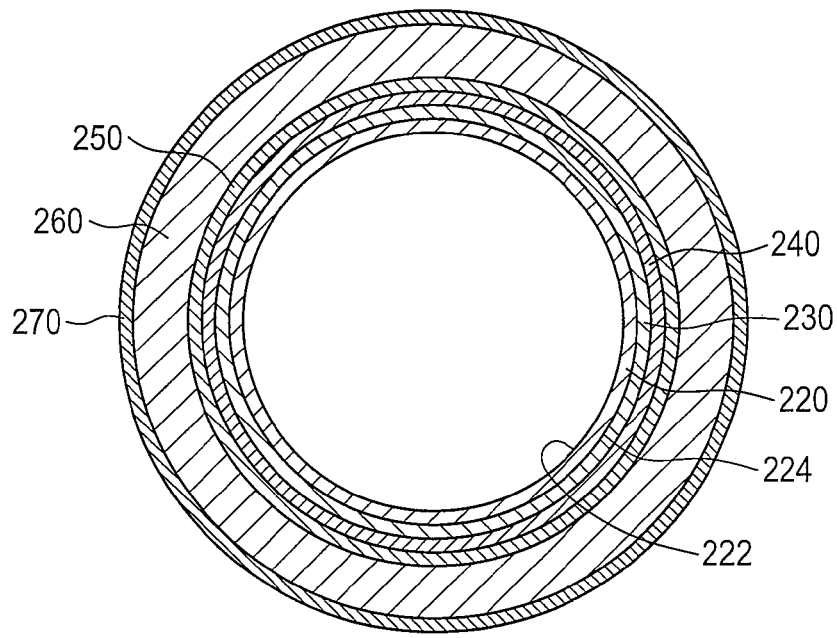
FIG. 8 is an end sectional view of the pipe in FIG. 7 along line DD'.

In a further aspect, a flexible high temperature pipe can be formed with one or more layers, such as reinforcing layers or sheathing, between the second reinforcing layer 140 and the insulating layer 160. In one aspect, this can be similar to the outer sheath 50 shown in the pipe 10 in FIGS. 1 and 2. FIGS. 7 and 8 show a pipe 210 with an inner a tubular layer 220 having an outer surface 124 and defining an inner diameter 122, a first reinforcing layer 230, a second reinforcing layer 240 and an outer sheath 250 that can be similar to the inner tubular layer 20, the first reinforcing layer 30, the second reinforcing layer 40 and the outer sheath 50 of pipe 10 shown in FIGS. 1 and 2. In addition, pipe 210 can have an insulating layer 260 provided over the sheath 250 and an outer jacket 270 that can be similar to the insulating layer 160 and outer jacket 170 of the pipe 110 shown in FIGS. 5 and 6.

In a further aspect, a flexible high temperature pipe can be formed without the outer jacket 170 so that the insulating layer 160 is exposed directly to the surroundings.

Method of Making a Pipe

With reference to FIG. 1, a pipe 10 can be formed by wrapping fibers around an inner tubular layer 20. The inner tubular layer 20 could be formed in an earlier process and used as a starting point for the process of making the pipe 10 by passing the earlier formed inner tubular layer 20 through the process so that the other layers can be applied to the previously formed inner tubular layer 20. Alternatively, the inner tubular layer 20 could be extruded during the process to provide continuous production of the pipe 10, allowing the finished pipe 10 to be wound around a spool and cut to a desired length.

If pipe 60 is being made, the first layer 65 and the second layer 68 of the inner layer 70 could be co-extruded together for form the inner layer 70 in a single stage of the process.

The first reinforcing layer 30 can be applied to the inner tubular layer 20 by winding fibers around the outer surface 24 of the inner tubular layer 20 in a first direction (clockwise or counter clockwise relative to the inner tubular layer 20) and at a first angle. In one aspect, these fibers are wound around the inner tubular layer 20 when it is in the solid state. However, the fibers for the first reinforcing layer 30 can also be wrapped around the inner tubular layer 20 while the inner tubular layer 20 is in a molten, semi-molten, uncured or semi-uncured state so that the outer surface 24 of the inner tubular layer 20 has not yet solidified. This can allow the fibers that will make up the first reinforcing layer 30 to sink to some degree into the outer surface 24 of the inner tubular layer 20 causing at least some of the fibers in the first reinforcing layer 30 to adhere or partially adhere to the outer surface 24 of the inner tubular layer 20.

One or more fibers are wound around the inner tubular layer 20 to form the first reinforcing layer 30, so that the fibers are in contact and covering the outer surface 24 of the inner tubular layer 20. In one embodiment, multiple tows each of multiple fibers are wrapped around the outer layer 24 of the inner tubular layer 20 to form the first reinforcing layer 30, with the number of tows used depending on the tow fiber count, desired layer characteristics, equipment capabilities, etc. The fibers in the first reinforcing layer 30 could be wound around the inner tubular layer 20 such that some of the fibers lie adjacent to the inner tubular layer 20 while other fibers of the first reinforcing layer 30 lie over top of subsequent fibers.

The winding of the fibers can be achieved with the use of a winder that winds the fibers in a helical fashion around the outer surface 24 of the inner tubular layer 20 as the inner tubular layer 20 is being advanced. The fibers can be wound at a substantially continuous tension level. The tension level used for the various fibers can be varied to accommodate the use different fibers of different materials, various characteristics of each fiber in the layer, to cause the fibers to sink into the outer surface 24 of the inner tubular layer 20, etc.

With the fibers of the first reinforcing layer 30 wound around the outer surface 24 of the inner tubular layer 20, more fibers are wound around the first reinforcing layer 30 in the other direction (i.e. the other of clockwise or counter clockwise relative to the inner tubular layer 20 that the fibers of the first reinforcing layer 30 are wound in) to form the second reinforcing layer 40. The fibers making up the second reinforcing layer 40 can all be wound at the same angle. The application of the second reinforcing layer 40 can be applied taking into consideration the different desired effects as outlined above with respect to the first reinforcing layer 30. In one aspect, the first reinforcing layer 30 and the second reinforcing layer 40 are made to have substantially the same load carrying capabilities with the first reinforcing layer 30 and the second reinforcing layer 40 having substantially equal numbers of fibers but applied with substantially opposite winding angles.

The outer sheath 50 can then be applied over the second reinforcing layer 40, such as by extrusion, spraying, dipping, tape winding, shrink wrapping, braiding, etc.

The inner tubular layer 20 can be selected to support the loads induced on it by the winding of the fibers of the first reinforcing layer 30 and the second reinforcing layer 40, as well as the application of the outer sheath 50. The tension of the fibers being wound around the inner tubular layer 20 to form the first reinforcing layer 30 and the second reinforcing layer 40 can be controlled to avoid the collapse of the inner tubular layer 20 during production of the pipe 10. However, in some cases it may be useful to support the inner tubular layer 20 by use of an internal support, such as rollers, internal pressure, etc. during the forming process for the pipe 10. It may also be useful to employ these internal supports to urge the inner tubular layer 20 into having a generally circular cross-section.

With reference to FIG. 5, the pipe 110 can be formed by using a similar process as the process described above for forming the pipe 10. The inner tubular layer 120, first reinforcing layer 130, the second reinforcing layer 140 and the outer jacket 170 can be applied as described above for the inner tubular 20, the first reinforcing layer 30 and the second reinforcing layer 40 of the pipe 10. With these layers in place, the insulating layer 120 can then be applied over the second reinforcing layer 140, such as by extrusion (i.e. a crosshead extrusion process, etc.).

In an aspect, extrusion of the insulating layer 160 may be accomplished using single screw extrusion, in single or tandem configuration, by twin-screw extrusion methods, etc. In the case of single screw extrusion, the extruder screw may be a single stage or 2-stage design. A single stage compression screw may be adequate for chemical foam extrusion whereby the foaming agent is added as a pelleted concentrate or masterbatch which is pre-mixed with the polymer to be foamed using a multi-component blender mounted over the main feed port of the extruder, for example. The design of the screw may incorporate barrier flights and mixing elements to ensure effective melting, mixing, and conveying of the polymer and foaming agent. With a 2-stage screw, the first and second stages can be separated by a decompression zone, at which point a gas or liquid physical foaming agent can be introduced into the polymer melt via an injection or feed port in the extruder barrel. The first stage can act to melt and homogenize the polymer, whereas the second stage can act to disperse the foaming agent, cool the melt temperature, and increase the melt pressure prior to the melt exiting the die. This may also be accomplished by tandem extrusion, wherein the two stages are effectively individual single screw extruders, the first feeding into the second. A 2-stage screw may be preferred for the extrusion of polymers which have a tendency to release volatiles when melted, or are hygroscopic, the extruder barrel may then be equipped with a vent port positioned over the decompression zone through which the volatiles or moisture can be safely extracted. Twin screw extrusion might be preferred where the polymer to be foamed is shear sensitive or if it is required that fillers or other additives be incorporated into the insulation composition. Twin screw extrusion might also be used for the extrusion of syntactic foams, or blown foams prepared by the physical injection of a gas or liquid foaming agent. Since the twin screw design is typically modular, comprising several separate and interchangeable screw elements such as mixing and conveying elements, it can offer great versatility with respect to tailoring the screw profile for optimum mixing and melt processing. In the case of syntactic foams, for example, the hollow microspheres can be fed directly into the polymer melt using a secondary twin-screw feeder downstream of the main polymer feed hopper. An additional consideration with syntactic foams is potential breakage of the hollow microspheres during extrusion of the foam. Shear and compressive forces inside the extruder might need to be minimized during processing of the material to prevent this through judicious design of the extruder screw(s), barrels, manifolds and dies. The preparation of the syntactic foam may be accomplished in situ with extrusion over the reinforcing layer, or as a prior compounding operation whence the compounded syntactic resin is then extruded as a separate and subsequent operation. In the latter method the likelihood of breakage of the hollow microspheres could be increased. In all the above extrusion methods, a static mixing attachment and/or gear pump may be inserted between the end of the screw and the die to further homogenize the melt, generate melt pressure, and minimize melt flow fluctuations.

With respect to the particular foam insulations described herein, the conditions of mixing, temperature and pressure might be selected and adjusted to provide a uniform foam structure, such as by comprising very small or microcellular bubbles with a narrow size distribution evenly distributed within the polymer matrix, in order to ensure optimum thermal performance and mechanical strength of the insulation.

Then the outer jacket 170 can be applied over the insulating layer 160, such as by extrusion. This can be achieved by placing the device applying the outer jacket 170 further downstream in the production process.

Performance

For many hydrocarbon handling operations, a pipe having a long term pressure capacity 3000 psi or greater, capable of withstanding bending strain of 5% and compatible with caring carrying fluids having an elevated temperature between 60°-120° C. is acceptable. Other performance properties may be desired for other applications.

Three high temperature flexible pipe were produced in accordance with Table I.

TABLE I

| | | Production | | |
|---|---|---|---|---|
| | | Case 1 | Case 2 | Case 3 |
| Inner Tubular Lining | | | | |
| Material | | Impact copolymer polypropylene | Nucleate of homopolymer PP | High crystalline copolymer PP |
| Liner ID | in | 3.02 | 3.04 | 3.04 |
| First Reinforcing Layer | | | | |
| Material | | ECR glass fibers | ECR glass fibers | ECR glass fibers |
| Wrap angle | deg. | 55 | 55 | 55 |
| Second Reinforcing Layer | | | | |
| Material | | ECR glass fibers | ECR glass fibers | ECR glass fibers |
| Wrap angle | deg. | 55 | 55 | 55 |
| Outer Sheath | | | | |
| Material | | Impact copolymer polypropylene | Nucleate of homopolymer PP | High crystalline copolymer PP |
| Outer Sheath OD | in | 3.96 | 3.98 | 3.98 |

The tested performance for the pipe of Table I is shown in Table II.

TABLE II

| | | Performance | | |
|---|---|---|---|---|
| | | Case 1 | Case 2 | Case 3 |
| Design operating pressure | psi | 1500 | 1500 | 1500 |
| Short Term Burst pressure | psi | 8905-9130 | 8812-9460 | 8710-9612 |
| Hold pressure test | psi | 4000 for over 800 hours @ 82° C. | 4700 for over 800 hours @ 93° C. | 4000 for over 552 hours @ 82° C. |
| Material mean tensile yield strength @ 23° C. | psi | 3635 | 4298 | 4183 |
| Material mean tensile yield strength @ 82° C. | psi | 1657 | 1792 | 2165 |
| Material mean tensile yield strength @ 93° C. | psi | 1225 | 1231 | 1926 |
| Pipe not damaged by impact test - 20 lbs @ 10' | ° C. | −25 | 0 | −15 |

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

The invention claimed is:

1. A high temperature flexible pipe comprising:
   an inner tubular layer formed of a high temperature thermoplastic and defining an inner diameter through which fluid can flow, the high temperature thermoplastic being HDPE-RT and having a tensile yield strength of at least 1350 psi at 82° C.;
   a first reinforcing layer of fibers helically wound in a first direction;
   a second reinforcing layer of fibers helically wound in a second direction; and
   an outer sheath enclosing the inner tubular layer, the first reinforcing layer and the second reinforcing layer,
   wherein the pipe is configured to retain mechanical properties at a service temperature of at least 82° C.

2. The pipe of claim 1 wherein the high temperature thermoplastic is a crystalline polymer material with a crystalline content of at least 45%.

3. The pipe of claim 1 wherein the fibers in the first reinforcing layer are all wound at substantially the same angle.

4. The pipe of claim 1 wherein the inner tubular layer is substantially liquid impermeable.

5. The pipe of claim 4 wherein the inner tubular layer is substantially gas impermeable.

6. The pipe of claim 1 wherein the first direction is a direction opposite to the second direction.

7. The pipe of claim 1 wherein the fibers in the first reinforcing layer are wound at an angle between 40° and 70°.

8. The pipe of claim 1 wherein the fibers in the first reinforcing layer are wound at an angle between 50° and 60°.

9. The pipe of claim 1 wherein the fibers are formed from at least one of: glass, carbon, nylon, polyester, aramid and metal.

10. The pipe of claim 9 wherein the fibers are formed of glass.

11. The pipe of claim 1 wherein spacings between the fibers in the first reinforcing layer and the fibers in the second reinforcing layer are sized to prevent the inner tubular layer from being forced through the spacings when pressurized fluid is passing through the pipe.

12. The pipe of claim 11 wherein there are no substantial spaces between the fibers in the first reinforcing layer and the fibers in the second reinforcing layer.

13. The pipe of claim 1 wherein the first reinforcing layer and the tubular layer are unbonded and the second reinforcing layer and the outer sheath are unbonded.

14. The pipe of claim 1 further comprising a liner within the inner tubular layer.

15. The pipe of claim 14 wherein the liner is significantly thinner than the inner tubular layer.

16. The pipe of claim 14 wherein the liner is formed of at least one of: polyphenylene sulfide, polyetheretherketone, polyvinylidene fluoride and polyamide.

17. The pipe of claim 14 wherein the liner and the inner tubular layer are bonded together.

18. The pipe of claim 1 further comprising an insulating layer.

19. The pipe of claim 18 wherein the insulating layer is provided between the second reinforcing layer and the outer sheath.

20. The pipe of claim 18 wherein the insulating layer is provided outside the outer sheath.

21. The pipe of claim 20 further comprising an outer jacked provided around the insulating layer.

22. The pipe of claim 18 wherein the insulating layer is formed of blown foam.

23. The pipe of claim 18 wherein the insulating layer is formed of a syntactic foam.

24. The pipe of claim 18 wherein the insulating layer is formed of a high temperature thermoplastic.

25. The pipe of claim 24 wherein the outer jacket is formed from a different material than the insulating layer.

26. The pipe of claim 1 wherein the outer sheath includes a thermoplastic the same as the high temperature thermoplastic in the inner tubular layer.

27. A method of making a flexible high temperature pipe, the method comprising:
providing an inner tubular layer formed of a high-temperature thermoplastic of HDPE-RT and having a tensile yield strength of at least 1350 psi at 82° C. and defining an inner diameter through which fluid can flow;
applying a first reinforcing layer by winding fibers around the inner tubular layer in a first direction; and
applying a second reinforcing layer by winding fibers around the first reinforcing layer in a second direction,
wherein the pipe is configured to retain mechanical properties at a service temperature of at least 82° C.

28. The method of claim 27 wherein the high temperature thermoplastic is a crystalline polymer material with a crystalline content of at least 45%.

29. The method of claim 27 wherein the inner tubular layer is extruded.

30. The method of claim 29 wherein the inner tubular layer is extruded as a first inner layer and a second layer, the second layer formed of the high temperature thermoplastic and the first layer formed of a different material and defining the inner diameter.

31. The method of claim 27 wherein the first direction is opposite to the second direction.

32. The method of claim 27 further comprising applying an outer sheath over the second reinforcing layer.

33. The method of claim 32 wherein the outer sheath includes a thermoplastic the same as the high temperature thermoplastic in the inner tubular layer.

34. The method of claim 27 further comprising:
applying an insulating layer.

35. The method of claim 34 wherein the insulating layer is formed of at least one of: blown foam and syntactic foam.

36. The method of claim 27 wherein the fibers are formed of glass.

* * * * *